United States Patent
Bisson et al.

(10) Patent No.: US 9,247,378 B2
(45) Date of Patent: Jan. 26, 2016

(54) METHOD FOR CONTROLLING AN HVAC SYSTEM USING A PROXIMITY AWARE MOBILE DEVICE

(75) Inventors: Reed Bisson, Minnetonka, MN (US); John B. Amundson, Minneapolis, MN (US)

(73) Assignee: Honeywell International Inc., Morristown (*) Notice: Subject to any disclaimer, the term of this patent is extended or adjusted under 35 U.S.C. 154(b) by 104 days.

(21) Appl. No.: 13/568,999

(22) Filed: Aug. 7, 2012

(65) Prior Publication Data

US 2014/0045482 A1    Feb. 13, 2014

(51) Int. Cl.
*H04M 3/00*    (2006.01)
*H04W 4/02*    (2009.01)
*H04W 84/18*   (2009.01)
*H04W 24/04*   (2009.01)

(52) U.S. Cl.
CPC .............. *H04W 4/02* (2013.01); *H04W 4/021* (2013.01); *H04W 4/027* (2013.01); *H04W 4/028* (2013.01); *H04W 24/04* (2013.01); *H04W 84/18* (2013.01)

(58) Field of Classification Search
CPC ...... H04W 4/021; H04W 84/18; H04W 24/04
USPC ......... 455/414.1–414.3, 418–420, 456.1–457
See application file for complete search history.

(56) References Cited

U.S. PATENT DOCUMENTS

| | | | |
|---|---|---|---|
| 6,400,956 B1 | 6/2002 | Richton | |
| 7,127,734 B1 | 10/2006 | Amit | |
| 7,130,719 B2 | 10/2006 | Ehlers et al. | |
| 7,155,305 B2 | 12/2006 | Hayes et al. | |
| 7,159,789 B2 | 1/2007 | Schwendinger et al. | |
| 7,257,397 B2 | 8/2007 | Shamoon et al. | |
| 7,343,226 B2 | 3/2008 | Ehlers et al. | |
| 7,451,017 B2 | 11/2008 | McNally | |

(Continued)

FOREIGN PATENT DOCUMENTS

| | | |
|---|---|---|
| WO | 2009034720 A1 | 3/2009 |
| WO | WO 2009/036764 | 3/2009 |

(Continued)

OTHER PUBLICATIONS

Allure Energy, "Our Technology," Allure Energy Inc., 1 page, printed May 30, 2012. http://www.allure-energy.com/pages/about.jsp.

(Continued)

*Primary Examiner* — Charles Appiah
*Assistant Examiner* — Jaime Holliday
(74) *Attorney, Agent, or Firm* — Seager, Tufte & Wickhem LLP

(57) ABSTRACT

A mobile wireless device (e.g. smart phone) may be used to remotely control an HVAC system. A program code stored in the memory of the mobile wireless device may cause the mobile wireless device to store geographic information in the memory of the mobile wireless device, monitor a location of the mobile wireless device, and compare the stored geographic information to the location of the mobile wireless device. If the comparison meets predetermined criteria, the program code may cause the mobile wireless device to transmit a command either directly or indirectly to an HVAC controller, causing the HVAC controller to transition from a first operating state having a first temperature setpoint to a second operating state having a second temperature setpoint.

21 Claims, 9 Drawing Sheets

(56) References Cited

U.S. PATENT DOCUMENTS

| | | |
|---|---|---|
| 7,510,126 B2 | 3/2009 | Rossi et al. |
| 7,574,208 B2 | 8/2009 | Hanson et al. |
| 7,668,532 B2 | 2/2010 | Shamoon et al. |
| 7,949,615 B2 | 5/2011 | Ehlers et al. |
| 8,126,685 B2 | 2/2012 | Nasle |
| 8,131,401 B2 | 3/2012 | Nasle |
| 8,135,413 B2 | 3/2012 | Dupray |
| 8,140,279 B2 | 3/2012 | Subbloie |
| 8,219,114 B2 | 7/2012 | Larsen |
| 8,229,722 B2 | 7/2012 | Nasle |
| 8,255,090 B2 | 8/2012 | Frader-Thompson et al. |
| 8,305,935 B2 | 11/2012 | Wang |
| 8,315,717 B2 | 11/2012 | Forbes, Jr. et al. |
| 8,332,055 B2 | 12/2012 | Veillette |
| 8,334,906 B2 | 12/2012 | Lipton et al. |
| 8,350,697 B2 | 1/2013 | Trundle et al. |
| 8,390,473 B2 | 3/2013 | Krzyzanowski et al. |
| 8,406,162 B2 | 3/2013 | Haupt et al. |
| 8,412,654 B2 | 4/2013 | Montalvo |
| 8,442,695 B2 | 5/2013 | Imes et al. |
| 8,509,954 B2 | 8/2013 | Imes et al. |
| 8,510,421 B2 | 8/2013 | Matsuzaki et al. |
| 8,577,392 B1 | 11/2013 | Pai et al. |
| 8,587,445 B2 | 11/2013 | Rockwell |
| 8,626,344 B2 * | 1/2014 | Imes et al. .................. 700/276 |
| 2002/0147006 A1 | 10/2002 | Coon et al. |
| 2004/0034484 A1 | 2/2004 | Solomita, Jr. et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0043477 A1 | 2/2007 | Ehlers et al. |
| 2007/0043478 A1 | 2/2007 | Ehlers |
| 2007/0060171 A1 | 3/2007 | Sudit et al. |
| 2007/0115902 A1 | 5/2007 | Shamoon et al. |
| 2007/0155401 A1 | 7/2007 | Ward et al. |
| 2007/0249319 A1 | 10/2007 | Faulkner et al. |
| 2007/0285510 A1 | 12/2007 | Lipton et al. |
| 2007/0287473 A1 | 12/2007 | Dupray |
| 2008/0262820 A1 | 10/2008 | Nasle |
| 2009/0012704 A1 | 1/2009 | Franco et al. |
| 2009/0063122 A1 | 3/2009 | Nasle |
| 2009/0076749 A1 | 3/2009 | Nasle |
| 2009/0083167 A1 | 3/2009 | Subbloie |
| 2009/0138099 A1 | 5/2009 | Veillette |
| 2009/0157529 A1 | 6/2009 | Ehlers et al. |
| 2009/0187499 A1 | 7/2009 | Mulder et al. |
| 2009/0195349 A1 | 8/2009 | Frader-Thompson et al. |
| 2009/0240381 A1 | 9/2009 | Lane |
| 2009/0302994 A1 | 12/2009 | Rhee et al. |
| 2009/0316671 A1 | 12/2009 | Rolf et al. |
| 2010/0034386 A1 | 2/2010 | Choong et al. |
| 2010/0069035 A1 | 3/2010 | Johnson |
| 2010/0088261 A1 | 4/2010 | Montalvo |
| 2010/0156665 A1 | 6/2010 | Krzyzanowski et al. |
| 2010/0188239 A1 | 7/2010 | Rockwell |
| 2010/0261465 A1 | 10/2010 | Rhoads et al. |
| 2010/0289643 A1 | 11/2010 | Trundle et al. |
| 2011/0004355 A1 | 1/2011 | Wang et al. |
| 2011/0022242 A1 | 1/2011 | Bukhin et al. |
| 2011/0214060 A1 * | 9/2011 | Imes et al. .................. 715/735 |
| 2011/0231020 A1 * | 9/2011 | Ramachandran et al. .... 700/278 |
| 2011/0246606 A1 | 10/2011 | Barbeau et al. |
| 2011/0290893 A1 * | 12/2011 | Steinberg .................. 236/49.3 |
| 2012/0065783 A1 | 3/2012 | Fadell et al. |
| 2012/0065802 A1 * | 3/2012 | Seeber et al. ............... 700/295 |
| 2012/0066168 A1 | 3/2012 | Fadell et al. |
| 2012/0191257 A1 | 7/2012 | Corcoran et al. |
| 2012/0246497 A1 | 9/2012 | Amadeu et al. |
| 2013/0267253 A1 * | 10/2013 | Case ..................... H04W 4/021 455/456.3 |
| 2013/0331087 A1 * | 12/2013 | Shoemaker et al. .......... 455/420 |
| 2013/0332007 A1 | 12/2013 | Louboutin |

FOREIGN PATENT DOCUMENTS

| | | |
|---|---|---|
| WO | 2009067251 A1 | 5/2009 |
| WO | WO 2011/121299 | 10/2011 |
| WO | WO 2012/068517 | 5/2012 |

OTHER PUBLICATIONS

Gupta et al., "Adding GPS control to Traditional Thermostats: An Exploration of Potential Energy Savings and Design Challenges," Massachusetts Institute of Technology, 18 pages, Downloaded Apr. 16, 2012.

Mozer, "The Neural Network House: An Environment that Adapts to its Inhabitants," Department of Computer Science University of Colorado, 5 pages, Downloaded May 29, 2012.

U.S. Appl. No. 13/559,443, filed Jul. 26, 2012.

Slavin, Alison Jane and Trundle, Stephen Scott, Remote Thermostat Control/Energy Monitoring, U.S. Appl. No. 61/179,224, filed May 18, 2009; 14 pages.

Gupta, Manu, A Persuasive GPS-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.

International Search Report for Corresponding Application No. PCT/US2010/042589 dated Nov. 22, 2010.

* cited by examiner

METHOD FOR CONTROLLING AN HVAC SYSTEM USING A PROXIMITY AWARE MOBILE DEVICE

CROSS-REFERENCE TO RELATED APPLICATIONS

This application is related to application Ser. No. 13/559,443 entitled "HVAC CONTROLLER WITH WIRELESS NETWORK BASED OCCUPANCY DETECTION AND CONTROL" filed on Jul. 26, 2012, application Ser. No. 13/559,470 entitled "METHOD OF ASSOCIATING AN HVAC CONTROLLER WITH AN EXTERNAL WEB SERVICE" filed on Jul. 26, 2012, and application Ser. No. 13/559,489 entitled "HVAC CONTROLLER HAVING A NETWORK-BASED SCHEDULING FEATURE" filed on Jul. 26, 2012, all of which are incorporated herein by reference in their entireties for all purposes.

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an
HVAC controller that controls various HVAC components of the HVAC system in order to affect and/or control one or more environmental conditions within the building. In some cases, it may be desirable for a user to be able to affect the operation of an HVAC system from a remote location.

SUMMARY

The present disclosure relates generally to HVAC systems, and more particularly to HVAC controllers that accommodate and/or facilitate control of an HVAC system from a remote location. In one illustrative embodiment, a computer readable medium includes a program code stored thereon in a non-transitory state for use by a user's mobile wireless device connectable to a network. The program code may be downloaded from an external server upon request and stored in the memory of a user's mobile wireless device. The program code may cause the user's mobile wireless device to execute a method including: storing geographic information in the memory of the user's mobile wireless device; monitoring a current location of the user's mobile wireless device; and comparing the stored geographic information and the current location of the user's mobile wireless device. If the comparison meets predetermined criteria, the program code may further cause the user's mobile wireless device to transmit a command causing an HVAC controller to transition from a first operating state having a first temperature setpoint to a second operating state having a second temperature setpoint. In some cases, the first operating state may be an unoccupied state having a corresponding first temperature setpoint, and the second operating state may be an occupied state having a corresponding second temperature setpoint. In some cases, the user's mobile wireless device is a GPS enabled smartphone, but this is not required. In some cases, the user's mobile wireless device does not broadcast GPS coordinates and/or other indications of a user's location to the network. Rather, the user's mobile wireless device locally does the compare between the stored geographic information and the current location of the mobile wireless device. This may help protect the privacy of the user.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which.

Figure 1:
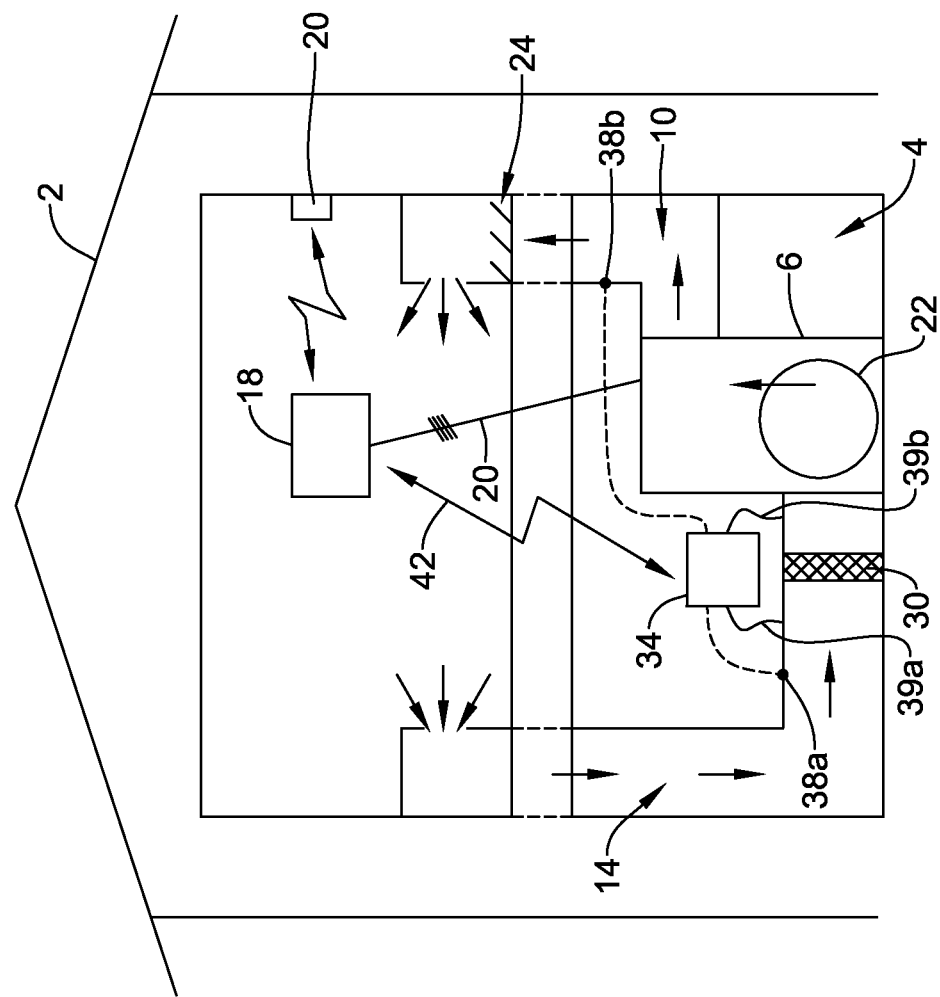
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative of the claimed disclosure.

While the embodiments described herein generally relate to HVAC systems and a system for controlling an HVAC system from a remote location, these are only some examples. It will be generally recognized by those of skill in the art that the system, as described herein according to the various embodiments, may be adapted and used to control an integrated home system from a remote location. For example, the system could be adapted and used to lock and/or unlock doors, open and/or close garage doors, turn on and/or off one or more lights within the home, and/or arm and/or disarm a home security system from a remote location.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 20 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
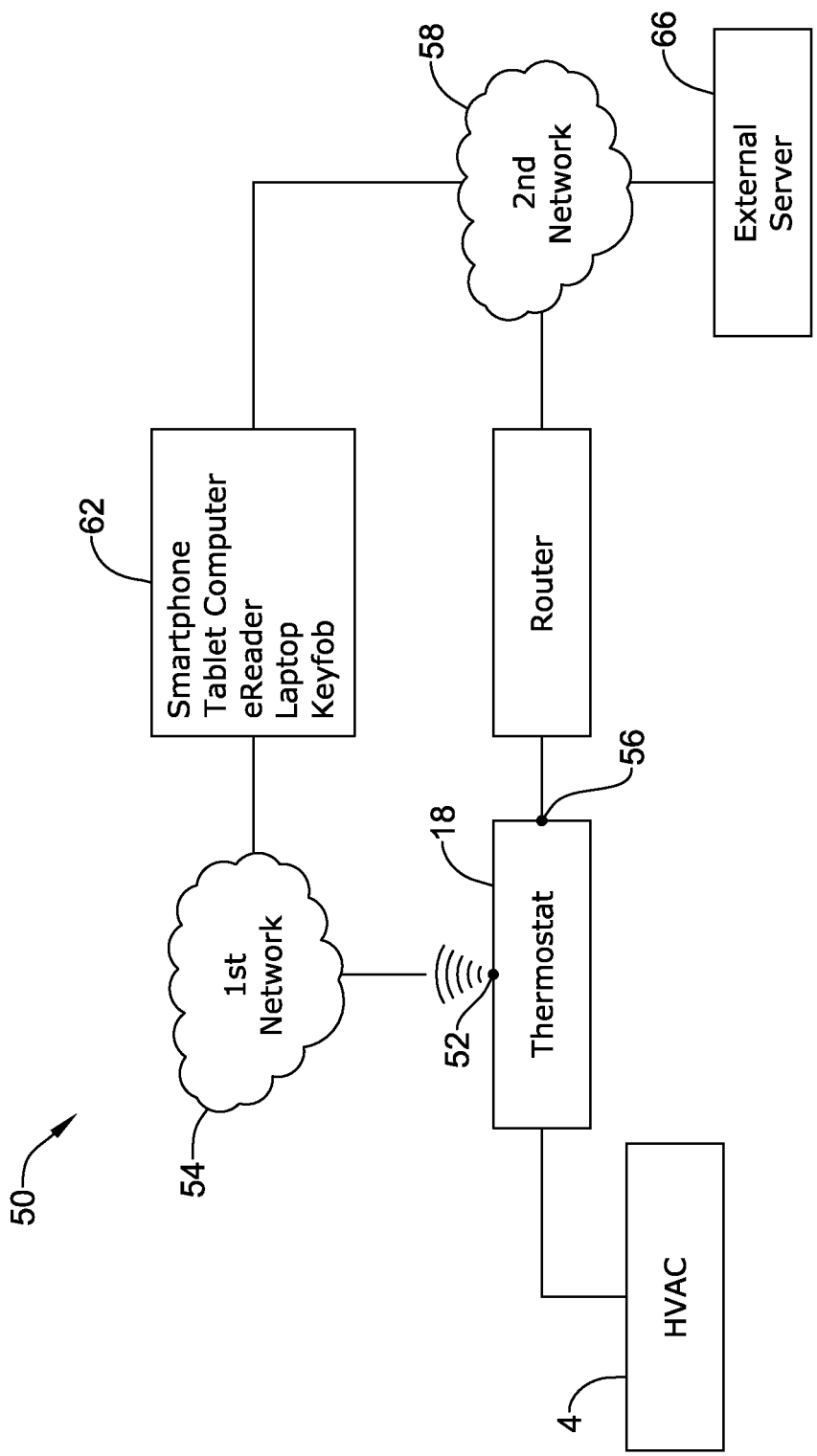
FIG. 2 is a schematic view of an illustrative HVAC control system that may facilitate access and/or control of the HVAC system of FIG. 1.

FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more components 6 of the HVAC system 4. As discussed above, the HVAC controller 18 may communicate with the one or more components 6 of the HVAC system 4 via a wired or wireless link. Additionally, the HVAC controller 18 may be adapted to communicate over one or more wired or wireless networks that may accommodate remote access and/or control of the HVAC controller 18 via another device such as a cell phone, tablet, reader, laptop computer, key fob, or the like. As shown in FIG. 2, the HVAC controller 18 may include a first communications port 52 for communicating over a first network 54, and/or a second communications port 56 for communicating over a second network 58. In some cases, the first network 54 may be a wireless local area network (LAN), and the second network 58 may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required. In some cases, the wireless local area network 54 may be an ad-hoc wireless network, but this is not required.

Depending upon the application and/or where the HVAC user is located, remote access and/or control of the HVAC controller 18 may be provided over the first network 54 and/or the second network 58. A variety of mobile wireless devices 62 may be used to access and/or control the HVAC controller 18 from a remote location (e.g. remote from HVAC Controller 18) over the first network 54 and/or second network 58 including, but not limited to, mobile phones including smart phones, PDAs, tablet computers, laptop or personal computers, wireless network-enabled key fobs, e-Readers, and the like.

In many cases, the mobile wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the second network 58 with an external web service 90 hosted by one or more external web servers 66. A non-limiting example of such an external web service 90 is Honeywell's TOTAL CONNECT™ web service. The HVAC controller 18 may be configured to upload selected data via the second network 58 to the external web service 90 where it may be collected and stored on the external web server 66. In some cases, the data may be indicative of the performance of the HVAC system 4. Additionally, the HVAC controller 18 may be configured to receive and/or download selected data, settings and/or services including software updates from the external web service 90 over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network 58. These are just some examples.

Figure 3:
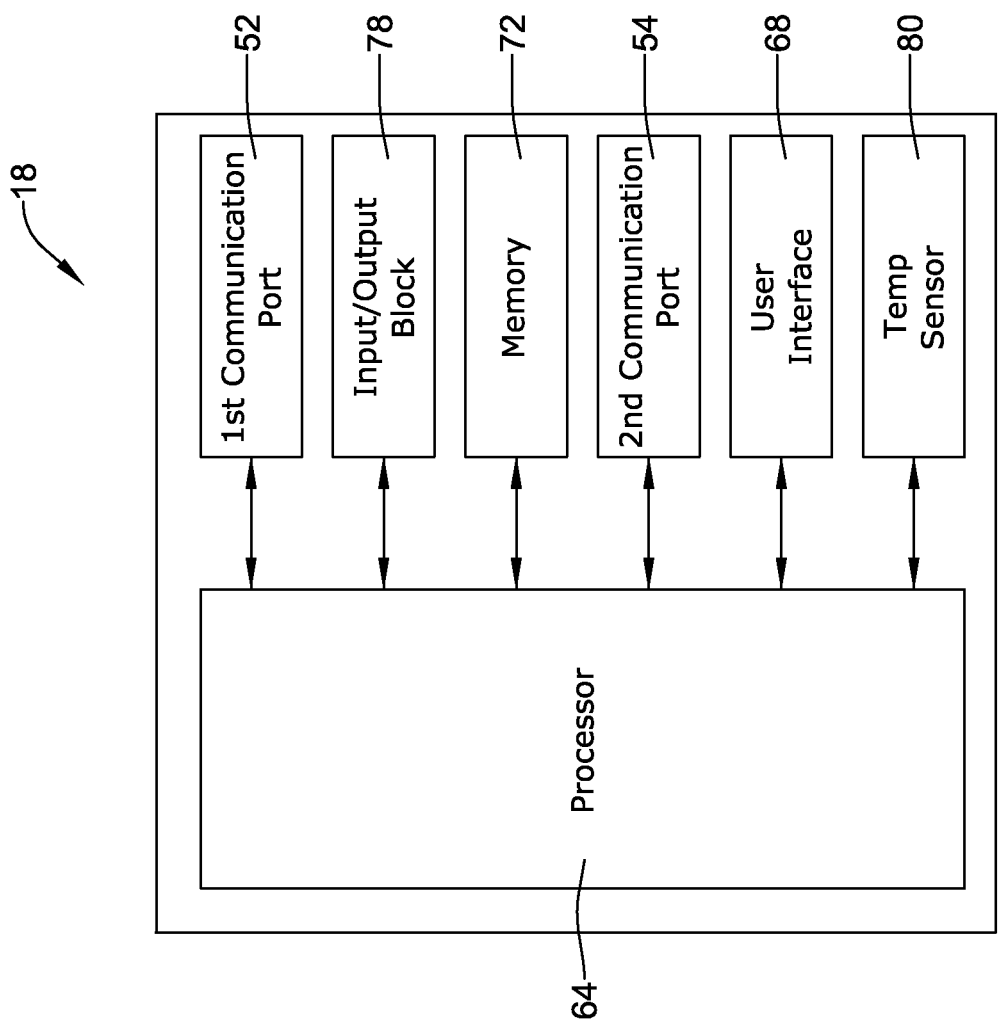
FIG. 3 is a schematic block diagram of an illustrative HVAC controller.

FIG. 3 is a schematic view of an illustrative HVAC controller 18 that may be accessed and/or controlled from a remote location over the first network 54 and/or the second network 58 (FIG. 2) using a mobile wireless device 62 such as, for example, a smart phone, a PDA, a tablet computer, a laptop or personal computer, a wireless network-enabled key fob, an e-Reader, and/or the like. In some instances, the HVAC controller 18 may be a thermostat, but this is not required. As shown in FIGS. 2 and 3, the HVAC controller 18 may include a first communications port 52 for communicating over a first network (e.g. wireless LAN) and/or a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some cases, HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition to, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The HVAC controller 18 may also include an internal temperature sensor 80, but this is not required. In some cases, the HVAC controller 18 may communicate with one or more remote temperature sensors, humidity sensors, and/or occupancy sensors located throughout the building or structure. The HVAC controller 18 may communicate with a temperature sensor and/or humidity sensor located outside of the building or structure for sensing an outdoor temperature and/or humidity if desired.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service 90 over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service 90 over the second network. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service 90 and delivered to the HVAC controller 18 via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service 90 and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases, such as where two or more user profiles are associated with the HVAC controller 18, the processor 64 may be programmed to include a set of rules for determining which individual user profile takes precedence for controlling the HVAC system when both user profiles are active.

In the illustrative embodiment of FIG. 3, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 need not be physically accessible to a user at the HVAC controller 18. Instead, the user interface 68 may be a virtual user interface 68 that is accessible via the first network 54 and/or second network 58 using a mobile wireless device 62 such as one of those devices previously described herein. In some cases, the virtual user interface 68 may include one or more web pages that are broadcasted over the first network 54 (e.g. LAN) by an internal web server implemented by the processor 64. When so provided, the virtual user interface 68 may be accessed over the first network 54 using a mobile wireless device 62 such as any one of those listed above. Through the one or more web pages, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, and the like.

In other cases, the virtual user interface 68 may include one or more web pages that are broadcasted over the second network 58 (e.g. WAN or the Internet) by an external web server (e.g. web server 66). The one or more web pages forming the virtual user interface 68 may be hosted by an external web service 90 and associated with a user account having one or more user profiles. The external web server 66 may receive and accept any user inputs entered via the virtual user interface and associate the user inputs with a user's account on the external web service 90. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the second network 58 to the HVAC controller 18 where it is received via the second port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

Referring back generally to FIG. 2, any number or wired or wireless devices, including the HVAC controller 18, and in some cases a user's mobile wireless device 62, may be connected to and enrolled in a building's wireless local area network 54. In some cases, the HVAC controller 18 may be configured to execute a program code stored in the memory 72 for connecting to and enrolling with the wireless local area network 54 of the building in which it is located. Each device may be assigned a unique identifier (e.g. IP address) upon enrollment with the wireless local area network. The unique identifier may be assigned by a router or other gateway device. The router or gateway device may store a local cache containing a list of unique identifiers (e.g. IP addresses) for each of the devices connected to the wireless local area network. The router or gateway can be a separate device from the HVAC controller 18, but this is not required. In some cases, a MAC address or MAC CRC address provided by the device being enrolled in the wireless local area network host upon connection of the device to the network may be used to uniquely identify the device on the wireless local area network 54 and/or wireless network 58. The unique identifier may be used to identify and recognize each device on the wireless local area network 54 each time the device is connected to the wireless local area network 54 and/or wireless network 58.

In some cases, more than one user's mobile devices 62 may be enrolled in a building's local area network 54. When so provided, the HVAC controller 18 may be programmed to remain in an occupied mode when any of the user's mobile devices 62 remain connected to and/or recognized by the wireless local area network 54. That is, the HVAC controller 18 may not enter an unoccupied mode until all of the user's mobile devices 62 are no longer connected to and/or recognized by the wireless local area network 54. Also, in some cases, the HVAC controller 18 may store a rank of various user mobile devices 62. When so provided, and when more than one user mobile devices are connected to and/or recognized by the wireless local area network 54, the HVAC controller 18 may control to the user profile that is associated with the particular user's mobile device 62 that is connected to and/or recognized by the wireless local area network 54 and has the highest rank.

Figure 4:
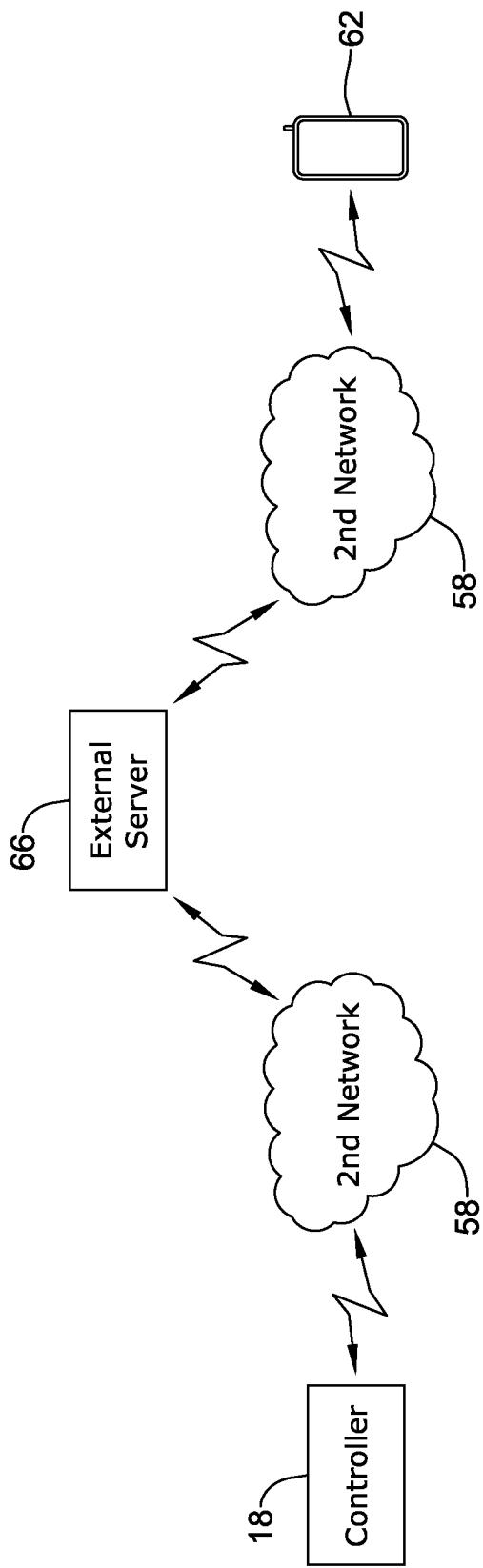
FIG. 4 is a schematic view of an illustrative HVAC controller in communication with a mobile wireless device.

FIG. 4 is a schematic view of an illustrative HVAC controller 18 in communication with a user's mobile wireless device 62 over the second wireless network 58. The mobile wireless device 62 may be any one of the mobile devices listed herein. In some cases, the mobile wireless device 62 may be a GPS enabled or proximity aware smart phone having a locating device for detecting the current location of the mobile wireless device 62. The user's mobile wireless device 62 may be programmed to communicate over the second network 58, sometimes with an external web service 90 hosted by one or more external web servers 66. A non-limiting example of such an external web service 90 is Honeywell's TOTAL CONNECT™ web service. In the example shown, the mobile wireless device 62 is configured to communicate wirelessly over the second network 58 with the external web service 90 hosted by one or more external web servers 66 and/or the HVAC controller 18 via one or more wireless communication protocols including, but not limited to, cellular communication (e.g. 3G or 4G), ZigBee, REDLINK™, Bluetooth, WiFi, IrDA, dedicated short range communication (DSRC), EnOcean, and/or any other suitable common or proprietary wireless protocol, as desired.

In some cases, the user's mobile wireless device 62 may be programmed to transmit one or more commands to the HVAC controller 18 for affecting control of the HVAC system 4 (FIG. 1) from a remote location. In some cases, as shown in FIG. 4, the user's mobile wireless device 62 may first transmit one or more commands to the external server 66 via the network 58. The external server 66 in turn, may send a corresponding command over the second network 54 to the HVAC controller 18 for affecting the desired control over the HVAC system 4. Because the user's mobile wireless device 62 may send signals to the HVAC controller 18 via the second wireless network 58, the user's mobile wireless device 62 need not be located in close proximity to the HVAC controller 18. For example, the user of the mobile wireless device 62 may be travelling a route between their residence in which the HVAC controller 18 is located and another location some distance away from their residence when the user's wireless device transmits one or more command to the HVAC controller 18 for affecting control of the HVAC system 4.

In some cases, the user's mobile wireless device 62 may be programmed to transmit one or more commands to the HVAC controller 18 after comparing its current location to geographical information previously stored in the memory of the mobile wireless device 62, and determining that the comparison meets (or does not meet) predetermined criteria. In sending a command to the HVAC controller 18 (either directly or indirectly) to affect control of the HVAC system 4, the mobile wireless device 62 may not broadcast global positioning system (GPS) coordinates or other location data to the HVAC controller 18 and/or the external server 66. This may help protect the privacy of the user.

Figure 5:
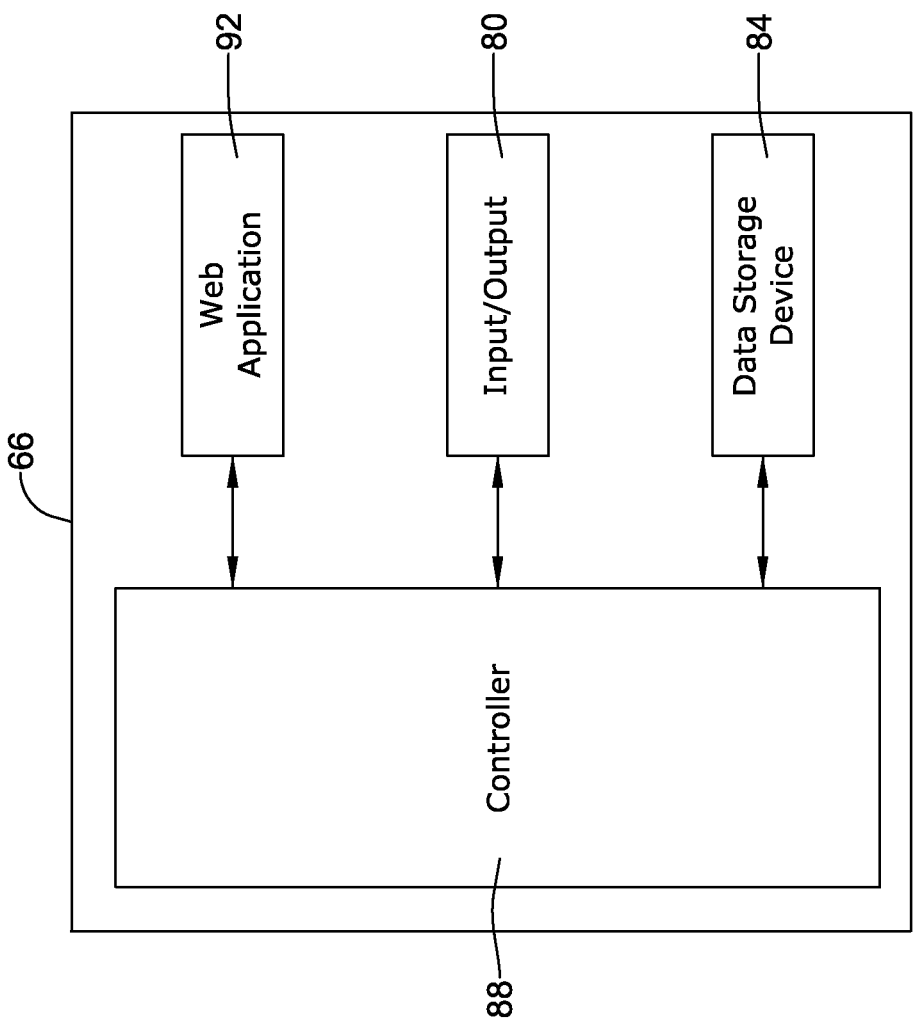
FIG. 5 is a schematic diagram of an external server that may be in communication with a mobile wireless device.

FIG. 5 is a schematic view of an external web server 66 that may receive a command from a user's mobile wireless device 62 as discussed above in reference to FIG. 4. As discussed above with reference to FIG. 4, the external web server 66 and the external web service 90 may be accessed by a user over the second network 58 using a mobile wireless device 62. The external web server 66 may be coupled to the HVAC controller 18 over the second network 58 via a gateway and/or via a local area network located within the user's home such as described above (see, for example, FIG. 2). As shown in FIG. 5, the external web server 66 may include at least one input/output port 80 for sending and/or receiving data over second network 58 to and from the HVAC controller 18 and/or the user's mobile wireless device 62. The external web server 66 may also include a data storage device 84, and a controller 88 coupled to the input output port 80 and the data storage device 84. In some cases, the controller 88 may be configured to implement a web application 92 for serving up one or more web pages over the second network 58 via the input/output port 80. The one or more web pages may be accessed and viewed by a user through the user interface of the mobile wireless device 62 over the second network 58 or other communications network. In some cases, the one or more web pages may provide a virtual user interface 68 (FIG. 3) for controlling the HVAC controller 18. Through the one or more web pages forming the virtual user interface 68, a user may respond to alerts and may enter or change various HVAC operating parameters including, but not limited, to temperature set points, humidity set points, starting times, ending times, schedule times, diagnostic limits, and/or the like, as well as respond to one or more alerts.

Figure 6:
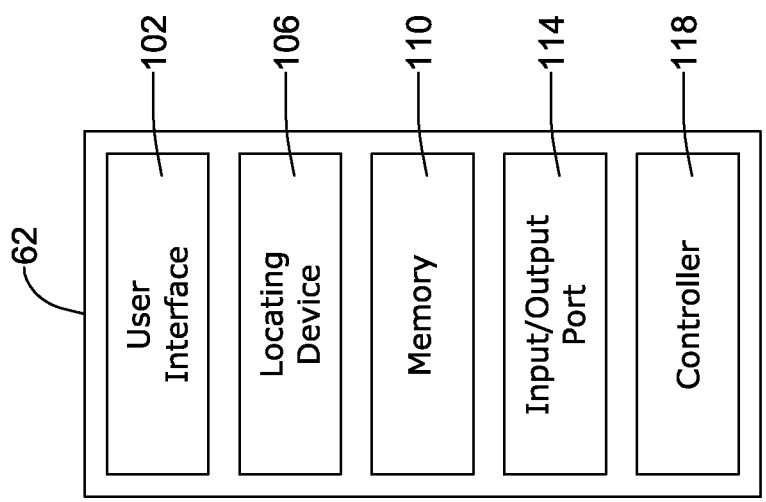
FIG. 6 is a schematic diagram of a mobile wireless device that may used to affect control of an HVAC system from a remote location.

FIG. 6 is a schematic view of a mobile wireless device 62 that may be used in accordance with an illustrative embodiment to transmit one or more commands to the HVAC controller 18 for affecting control of the HVAC system 4 from a remote location. As shown in FIG. 6, the mobile wireless device 62 may include a user interface 102 for accepting one or more interactions from a user, a locating device 106 for monitoring a current location of the mobile wireless device 62, a memory 110, an input/output port 114 for sending and/or receiving data over one or more networks such as, for example, second network 58, and a controller 118.

The memory 110 may be used to store any number of data and application programming codes. In some cases, the memory 110 may store geographical information. As will be described in greater detail below, the geographical data stored in the memory 110 may be used by the controller 118 to determine whether or not to transmit a command to the HVAC controller 18 for affecting control of the HVAC system 4. Such geographical information may be relevant to a user's location and may include geographical data indicating the location of the user's residence, business, or other location. In some cases, the geographical information may include a predefined proximity zone defined relative to the location of the user's residence in which the HVAC controller 18 is located. The predefined proximity zone may have at least one outer boundary. In some cases, the predefined proximity zone may have a number of outer boundaries. The outer boundaries of the predefined proximity zone may be established at a distance away from the user's residence and may define any number of shapes including, but not limited to a circle, square, rectangle, hexagon and/or the like. In some cases, the outer boundaries of the predetermined proximity zone may be defined by a radius extending away from the user's residence by a distance of about 5 miles, 10 miles, 15 miles, 25 miles, etc. In other cases, the outer boundaries of the predefined proximity zone may correspond to a geographical region such as for example, the geographical boundaries of the city, zip code region, or county in which the user's residence is located. In some cases, the geographical information may include at least one established route typically followed by the user of the mobile wireless device 62 between a first location (e.g. the user's home) and at least one other location.

The controller 118 may be coupled to the user interface 103, the locating device 106, the memory 110, and the input/output port 114. In some cases, an application program code (i.e. app) may be stored in the memory 110 for execution by the controller 118, and may be used to cause the mobile wireless device 62 to send one more commands to the HVAC controller 18 affect control of the HVAC system 4. The application program code (app) may be provided for downloading from the external web service 90 hosted by the external web server 66 to which the HVAC controller 18 may also be connected (see, for example, FIG. 2), as described above with reference to FIG. 5, or another external web service 90 (e.g. ITUNES® or Google's App Store). The application program code (app) may be downloaded to the user's mobile wireless device 62 or other remote device such as for example, a tablet computer, laptop computer or personal computer upon request.

In some cases, the application program code is stored in the memory 110 and causes the controller 118 to monitor a current location of the user's mobile wireless device 62 via the locating device 106, and to compare the current location of the mobile wireless device 62 to geographical information stored in the memory 110. The application program code may also cause the controller 118 to transmit a command causing the HVAC controller 18 to transition from a first operating state having a first operating parameter set point to a second operating state having a second operating parameter setpoint, when the comparison meets predetermined criteria. In sending the command to the HVAC controller 18 to affect control of the HVAC system 4, the mobile wireless device 62 need not broadcast global positioning system (GPS) coordinates or other specific location data to the HVAC controller 18 and/or the external server 66 over the network 58. Instead, the comparison can be done locally at the mobile wireless device 62.

In some cases, the first operating state may correspond to an occupied state of the HVAC controller 18 having a first temperature setpoint and the second operating state may correspond to an unoccupied state of the HVAC controller 18 having a second temperature setpoint. In other cases, the first operating state may correspond to an unoccupied state having a first temperature setpoint and the second operating state may correspond to an occupied state having a second temperature setpoint. In still other cases, the first operating state may correspond to an unoccupied state of the HVAC controller 18 having a first temperature set point and the second operating state may correspond to an extended away unoccupied state of the HVAC controller 18 having a second temperature set point. In this case, the second temperature set point associated with the extended away unoccupied state of the HVAC controller 18 may be more energy efficient than the temperature set point associated with the unoccupied state of the HVAC controller 18. The controller 18 may be configured to send a command to transition the HVAC controller 18 from the unoccupied state to the extended away unoccupied state if the controller 118 determines that the HVAC controller 18 has been operating according to the unoccupied state for a predetermined amount of time such as, for example, after about 24 hours, 36 hours, 48 hours, 72 hours, etc.

In one example, a user may use their mobile wireless device 62 to affect control of the HVAC system 4 located within their home as they travel between their home and at least one another location. While the examples are described in relation to a user's home, it will be readily understood that the examples may be applied to any building in which the user desired to affect control of an HVAC system from a remote location. In some cases, an application program code (i.e. app) may be stored in the memory 110 of the user's mobile wireless device 62 for execution by the controller 118, and may cause the controller 118 to store a predefined proximity zone and/or at least one route travelled by a user between a first location and at least one other location.

Figure 7:
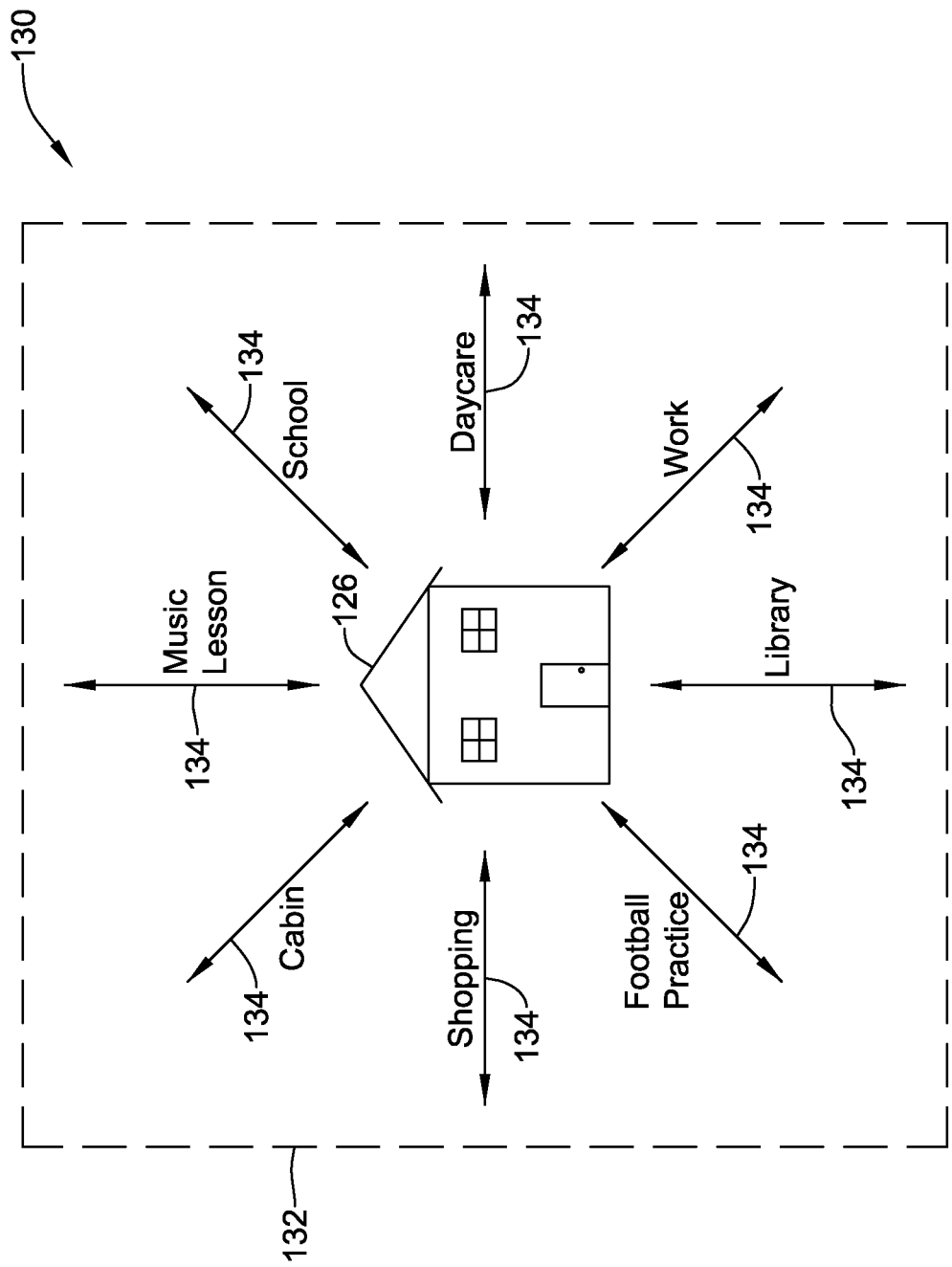
FIG. 7 is a diagram of a user's residence situated within a predefined proximity zone.

FIG. 7 is a diagram of a user's home 126 situated within a predefined proximity zone 130. The predefined proximity zone 130 is indicated by the dashed lines in FIG. 7. In the example shown, the predefined proximity zone 130 may have an outer boundary 132. In some cases, the predefined proximity zone 130 may have more than one outer boundary 132. The one or more outer boundaries 132 of the predefined proximity zone 130 may each be established at a predetermined distance away from the user's residence 126, and may define any number of shapes including, but not limited to a circle, square, rectangle, hexagon and/or the like. In some cases, the one or more outer boundaries 132 of the predetermined proximity zone may be defined by a radius extending away from the user's residence 126 by a distance of about 5 miles, 10 miles, 15 miles, 25 miles, etc. In some cases, each outer boundary 132 may define a different predetermined proximity zone. For example, one predefined proximity zone may have a 1 mile radius about the user's residence 126, while another predefined proximity zone may have a 5 mile radius about the user's residence 126. These are just some examples. In some cases, the one or more outer boundaries 132 of the predefined proximity zone 130 may correspond to a geographical region such as, for example, the geographical boundaries of the city, a zip code region, or county in which the user's residence is located. In some cases, the user's residence may be centered within in the predefined proximity zone 130, but this is not required.

In some cases, the application program code stored in the memory 110 of the user's mobile wireless device 62 may determine the predefined proximity zone upon acceptance of a user's residential address from a user, or upon detection of the geographical location (e.g. GPS coordinates) of the user's residence 126 via the locating device 106. The application program code may use the geographical location of the user's residence 126 to determine one or more boundaries of the predefined proximity zone 130 according to an algorithm suitable for that purpose. In other cases, such as for example, where a user has registered their HVAC controller 18 with an external web service 90, the external web service 90 may include program code that may determine one or more boundaries of the predefined proximity zone 130 relative to the user's residence. The geographical location of the user's residence may be provided by the user to the external web service 90 or, alternatively, the HVAC controller 18, when activated, may transmit geographical information corresponding to its location to the external web service 90. This information may then be delivered to the user's mobile wireless device 62, such as via the second network 58, where it may be stored in the memory 110 of the user's mobile wireless device 62.

Alternatively, or in addition, one or more routes may be stored in the memory 110 of the user's mobile wireless device 62. In FIG. 7, multiple routes 134 are shown. These routes 134 may be routes that are travelled by a user, such as between their home and at least one other location (e.g. work, school, day care, shopping, sports practice, music lessons, library, cabin, etc.). While the routes 134 are represented by straight lines in the illustrative diagram of FIG. 7, it will be understood that a user's route between their home and another location is rarely straight. In some cases, as shown in FIG. 7, at least a portion of each of the user's routes 134 may be contained within the predefined proximity zone 130. In some cases, two or more routes may be combined to define a single route, as a user may not travel directly between a first and second location. For example, when travelling between work and home, a user may divert from the direct route home to pick up a child from school and/or to stop at a business to run an errand. A user may also change the route that they typically travel between a first and a second location to avoid traffic delays. Over a period of time, the user's mobile wireless device 62 may learn a number of routes that a user travels, and may subsequently be able to predict a route that a user may take between their home and at least one other location with a confidence level of at least about 50%, 60%, 75%, 90%, 95%, or 99%+. The longer the period of time, the more routes the user's mobile wireless device 62 may be able to learn, and the more accurately the user's mobile wireless device may be able to predict a user's route. In some cases, the learning process may take up to about three days, one week, two weeks, three weeks, one month, three months, six months, etc. In many cases, the route learning process is continuous with the user's route information being constantly updated over time.

In some cases, as described above, the application program code stored in the memory 110 of the of the user's mobile wireless device 62 may cause the controller 118 of the user's mobile wireless device 62 to monitor a current location of the user's mobile wireless device 62 using the locating device 106 and compare the current location of the user's mobile wireless device 62 with geographical information stored in the memory 110 of the mobile wireless device 62. While the controller 118 may monitor a current location of the user's mobile wireless device 62 via the locating device 106, and may compare the current location of the mobile wireless device 62 to geographical information stored in the memory 110, the controller 118 may not broadcast global positioning system (GPS) coordinates (or other specific location data) to the HVAC controller 18 and/or the external server 66 over the network 58. This may help protect the privacy of the user.

In some cases, the application program code may cause the controller 118 of the user's mobile wireless device 62 to determine if the comparison meets predetermined criteria, and if so, transmit a command either directly or indirectly to the HVAC controller 18 to affect control of the HVAC system 4. For example, in some cases, the geographical information stored in the memory 110 may include the predefined proximity zone 130 having one or more outer boundaries 132, and the predetermined criteria may include a determination that at least one of the outer boundaries 132 have been crossed by the user as the user travels to and/or from a first location and a second location. The outer boundary 132 may be crossed in either direction as the user travels to and/or from a first location and a second location.

In another example, the geographical information stored in the memory 110 of the user's mobile wireless device 62 may include at least one route followed by the user to travel between a first location and at least one other location such as one or routes 134 of FIG. 7, and the predetermined criteria may include a determination that the user is following the at least one route. In yet another example, the geographical information may include a predefined proximity zone 130 having at least one outer boundary 132, and at least one route followed by the user of the mobile wireless device 62 when traveling between a first location and a second location. The predetermined criteria may include a determination the user has crossed an outer boundary of the predefined proximity zone and is following the at least one route. As discussed above, and in some cases, the application program code may cause the controller 118 of the user's mobile wireless device 62 to learn one or more routes 134 that the user frequently follows between their home 126 and one or more locations and to store the learned routes 134 in the memory 110 of the mobile wireless device 62.

As the user travels away from their home 126 and crosses the at least one outer boundary 132 of the proximity zone 130, the application program code may cause the controller 118 of the user's mobile wireless device 62 to send a command either directly or indirectly to the HVAC controller 18 located within the user's home 126 to transition from an occupied state having a first temperature setpoint to an unoccupied state having a second temperature set point. As the user travels toward their home 126 and crosses the at least one outer boundary 132 of the proximity zone 130, the application program code may cause the controller 118 of the user's mobile wireless device 62 to send a command either directly or indirectly to the HVAC controller 18 located within the user's home 126 to transition from the unoccupied state having the second temperature setpoint to the occupied state having the first temperature set point. While temperature setpoints are used here as an example, it is contemplated that the occupied and unoccupied states may have other parameters as well that may be changed, such as ventilation settings, humidity settings, etc.

In some cases, two or more outer boundaries 132 may be established, such as one having a one mile radius around the user's home 126 and another having a five mile radius around the user's home 126. As the user crosses each of the outer boundaries, the application program code may cause the controller 118 of the user's mobile wireless device 62 to send a command either directly or indirectly to the HVAC controller 18 located within the user's home 126 to transition to a different set point. Typically, the further the user is from the home 126, the more the temperature setpoint may be setback from the occupied set point, particularly since, on average, more time will be available to recover from the setback temperature to the occupied temperature setpoint.

Figure 8:
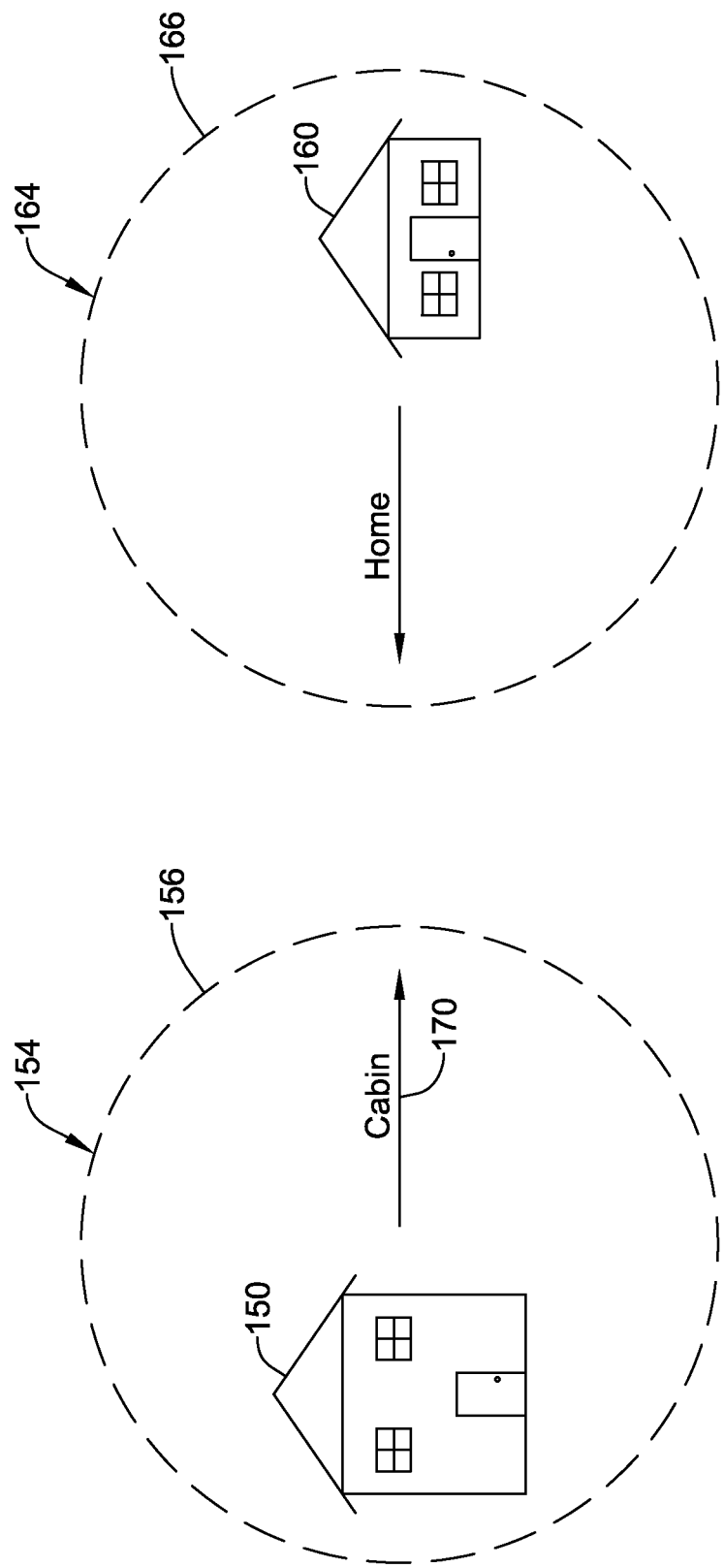
FIG. 8 is a diagram of a first user location situated within a first predefined proximity zone and a second user location situated within a second predefined proximity zone.

In another example, and as best shown in FIG. 8, the geographical information may include the location of the user's home 150, a first predefined proximity zone 154 having at least one outer boundary 156 associated with the user's home 150, the location of the user's cabin (or business) 160, a second predefined proximity zone 164 having at least one outer boundary 166 associated with the user's cabin 160, and/or at least one route 170 that a user may travel between their home 150 and their cabin 160. As described herein, and in some cases, the application program code may cause the controller 118 of the user's mobile wireless device 62 to learn one or more routes 170 that a user may travel between their home 150 and their cabin 160 and store the route information in the memory 110 of the user's mobile wireless device 62. In some cases, while the controller 118 monitors a current location of the user's mobile wireless device 62 via the locating device 106 and compares the current location of the mobile wireless device 62 to geographical information stored in the memory 110, the controller 118 may not broadcast global positioning system (GPS) coordinates to the HVAC controller 18(s) and/or the external server 66 over the network 58.

In some cases, the geographical information stored in the memory 110 includes the first predefined proximity zone 154 having one or more outer boundaries 156, and the predetermined criteria includes a determination that at least one of the outer boundaries 156 have been crossed by the user as they travel away from their home 150. As the user travels away from their home 150 and crosses the at least one outer boundary 156 of the first proximity zone 154, the application program code may cause the controller 118 of the user's mobile wireless device 62 to send a command either directly or indirectly to a first HVAC controller located within the user's home 150 to transition from an occupied state having a first temperature setpoint to an unoccupied state having a second temperature set point. As the user continues to travel toward their cabin 160 and crosses an outer boundary 166 of the second proximity zone 164, the application program code may further cause the controller 118 of the user's mobile wireless device to transmit a command either directly or indirectly to the HVAC controller 18 located within the user's cabin 160 to transition from an unoccupied state or extended away unoccupied state having a first temperature set point to an occupied state having a second temperature set point. In some cases, upon crossing the outer boundary 166 of the second proximity zone 164, the controller 118 may also transmit a command to the HVAC controller 18 located within the user's home 150 to transition from the unoccupied state having a second temperature setpoint to an extended away unoccupied state having a temperature set point that is more energy efficient than the second temperature setpoint. The reverse may also be true for the user when travelling from their cabin 160 back to their home 150.

In another example, the geographical information stored in the memory 110 of the user's mobile wireless device 62 may include at least one route 170 followed by the user to travel between their home 150 and their cabin 160, and the predetermined criteria may include a determination that the user is following the route 170 between their home 150 and their cabin 160. When the controller 118 determines that the user is following the route 170 toward their cabin 160, the application program code may cause the controller 118 of the user's mobile wireless device 62 to send a command to the first HVAC controller 18 located within the user's home 150 to transition from an occupied state having a first temperature setpoint to an unoccupied state having a second temperature set point. As the user continues to follow the route 170 toward their cabin 160, the application program code may further cause the controller 118 of the user's mobile wireless device 62 to transmit a command to the HVAC controller 18 located within the user's cabin 160 to transition from an unoccupied state or extended away unoccupied state having a first temperature set point to an occupied state having a second temperature set point. In some cases, as the user is travelling nearer to the cabin 160, the controller 118 may also transmit a command to the HVAC controller 18 located within the user's home to transition from the unoccupied state having a second temperature setpoint to an extended away unoccupied state having a temperature set point that is more energy efficient than the second temperature setpoint. The reverse may also be true for the user when travelling from their cabin 160 back to their home 150.

In yet another example, the geographical information stored in the memory 110 of the user's mobile wireless device 62 may include the first predefined proximity zone 154 having at least one outer boundary 156, the second predefined proximity zone 164 having at least one outer boundary 166 and at least one route 170 followed by the user of the mobile wireless device 62 to travel between a first location (e.g. home 150) and a second location (e.g. cabin 160), and the predetermined criteria may include a determination if the user has crossed an outer boundary 156 or 166 of either of the first or second predefined proximity zones 154, 164 and is following the at least one route 170 between the first location (e.g. home 150) and the second location (e.g. cabin).

Figure 9:
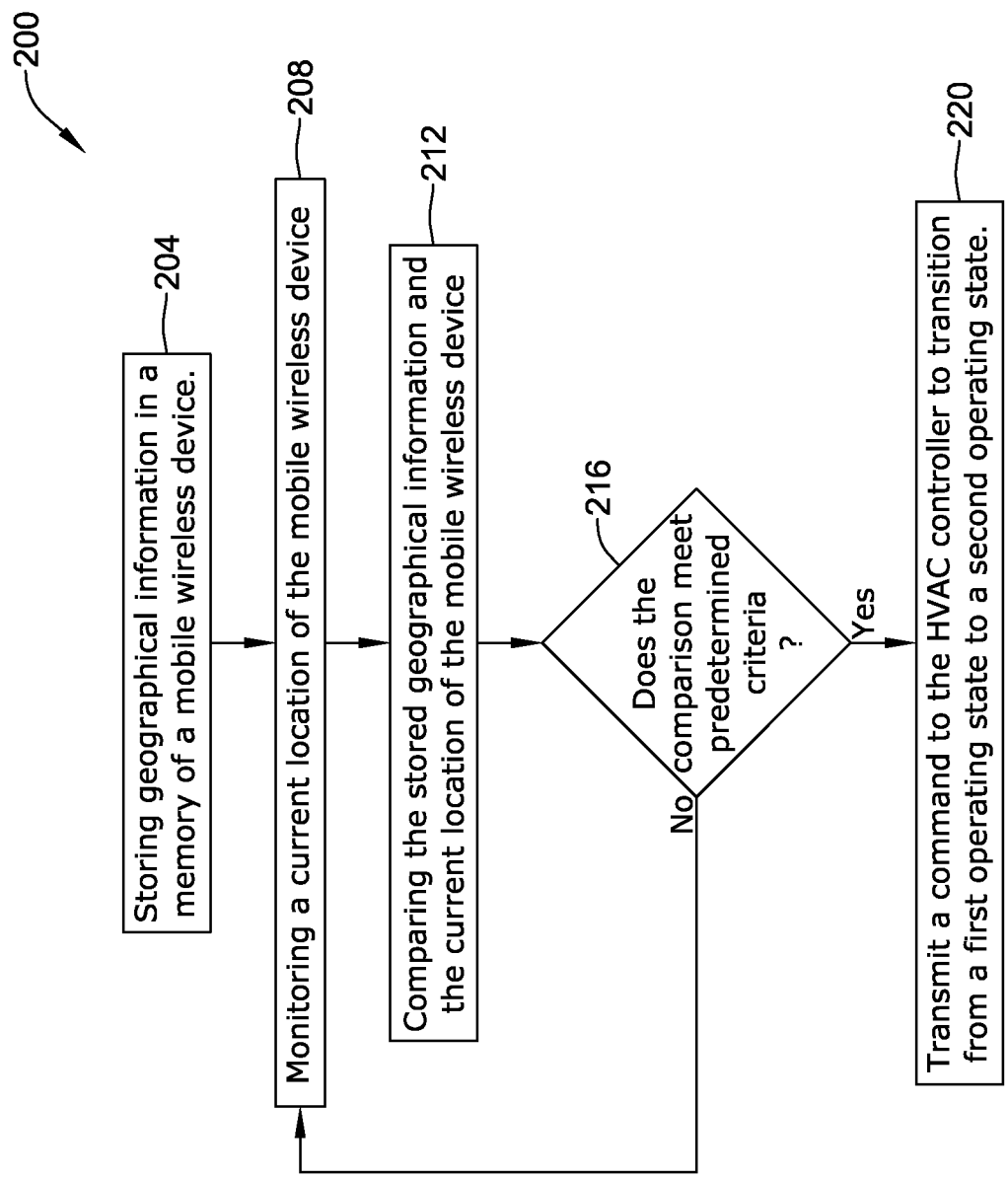
FIG. 9 is a flow chart of a method of controlling an HVAC system from a remote location using a mobile wireless device.

FIG. 9 is a flow chart of an illustrative method 200 of controlling an HVAC system from a remote location using a mobile wireless device 62 as described herein. As discussed above, the mobile wireless device 62 may include an application program code, sometimes downloaded from an external server, stored in the memory 110 of the mobile wireless device. The application program code may cause the controller 118 of the mobile wireless device 62 to execute the method 200. In some cases, the method 200 includes storing geographic information in the memory 110 of the mobile wireless device 62, and monitoring a current location of the mobile wireless device 62 via the locating device 106 (Blocks 204 and 208). The method 200 may also include comparing the geographic information stored in the memory 110 to the current location of the mobile wireless device and determining whether or not the comparison meets predetermined criteria (Blocks 212 and 216). If the comparison does not meet predetermined criteria, then the mobile wireless device 62 continues to monitor the current location of the mobile wireless device and compares the current location with the stored geographical information stored in the memory 110. If the comparison does meet predetermined criteria, the mobile wireless device 62 may transmit a command either directly or indirectly to the HVAC controller 18 to transition the HVAC controller 18 from a first operating state having a first temperature set point to a second operating state having a second temperature set point (Block 220). In some cases, while the controller 118 may monitor a current location of the user's mobile wireless device 62 via the locating device 106, and may compare the current location of the mobile wireless device 62 to geographical information stored in the memory 110, the controller 118 may not broadcast global positioning system (GPS) coordinates to the HVAC controller 18 and/or the external server 66 over the network 58. When so provided, this may help protect the user's privacy.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. A non-transitory computer readable medium having stored thereon a program code for use by a user's mobile wireless device connectable to a network, the program code causing the user's mobile wireless device to execute a method comprising:
    storing geographic information in a memory, wherein the geographic information comprises an outer boundary about a first location and a route between the first location and a second location;
    monitoring a current location of the user's mobile wireless device;
    comparing the stored geographic information and the current location of the user's mobile wireless device, and:
        if the comparison meets a first predetermined criteria, the user's mobile wireless device transmitting a first command causing an HVAC controller to transition from a first operating state having a first temperature setpoint to a second operating state having a second temperature setpoint, wherein the first predetermined criteria comprises a determination that the user's mobile wireless device crossed the outer boundary stored in the memory; and
        if the comparison meets a second predetermined criteria, the user's mobile wireless device transmitting a second command, wherein the first and second commands are different, and wherein the second predetermined criteria comprises a determination that the user's mobile wireless device is following the route.

2. The non-transitory computer readable medium according to claim 1, wherein the first location corresponds to a residence of a user.

3. The non-transitory computer readable medium according to claim 1, wherein the user's mobile wireless device is a GPS-enabled mobile phone.

4. The non-transitory computer readable medium according to claim 3, wherein the user's mobile wireless device does not broadcast GPS coordinates to the network in order to monitor the current location of the user's mobile wireless device or compare the stored geographic information and the current location of the mobile wireless device.

5. The non-transitory computer readable medium according to claim 1, wherein the first operating state corresponds to an unoccupied state of the HVAC controller and the second operating state corresponds to an occupied state of the HVAC controller.

6. The non-transitory computer readable medium according to claim 1, wherein the first operating state corresponds to an occupied state of the HVAC controller and the second operating state corresponds to an unoccupied state of the HVAC controller.

7. The non-transitory computer readable medium according to claim 1, wherein the first operating state corresponds to an unoccupied state of the HVAC controller and the second operating state corresponds to an extended away unoccupied state of the HVAC controller.

8. The non-transitory computer readable medium according to claim 7 wherein a temperature setpoint associated with the extended away unoccupied state of the HVAC controller is more energy efficient than a temperature setpoint associated with the unoccupied of the HVAC controller.

9. The non-transitory computer readable medium according to claim 1, wherein transmitting the first command comprises transmitting the first and second commands to a remote server via the network, wherein the remote server sends a corresponding command to the HVAC controller.

10. The non-transitory computer readable medium according to claim 1, wherein the program code further causes the user's mobile wireless device to learn the route between the first location and the second location by monitoring the current location of the user's mobile wireless device over time.

11. The non-transitory computer readable medium according to claim 10, wherein the first location corresponds to a user's home and wherein the HVAC controller is located with the user's home.

12. A remote server accessible over a network, the remote server comprising:
    an input/output port for sending and/or receiving data via the network;
    a data storage device storing a program code for download via the network for use by a user's mobile wireless device connectable to the network, the program code configured to cause the user's mobile wireless device to:
        store geographic information in a memory of the user's mobile wireless device, wherein the geographic information comprises an outer boundary;
        cause the user's mobile wireless device to learn at least one route between a first location and at least one other location, and to store the at least one learned route in the memory;
        monitor a current location of the user's mobile wireless device;
        compare the stored geographic information and the current location of the user's mobile wireless device and:
            if the comparison meets a first predetermined criteria, the program code is configured to cause the user's mobile wireless device to transmit a first command causing an HVAC controller to transition from a first operating state having a first temperature setpoint to a second operating state having a second temperature setpoint, wherein the first predetermined criteria comprises a determination that the user's mobile wireless device is following one of the at least one learned route; and
            if the comparison meets a second predetermined criteria, the user's mobile wireless device transmitting a second command, wherein the second predetermined criteria comprises a determination that the user's mobile wireless device crossed the outer boundary stored in the memory;
    a controller coupled to the input/output port and the data storage device, the controller configured to download the program code to a remote device upon request.

13. The remote server according to claim 12, wherein the remote device comprises the user's mobile wireless device.

14. The remote server according to claim 12, wherein the controller is further configured to implement a web application for serving up one or more web pages over the network, wherein the one or more web pages provide a virtual user interface for the HVAC controller.

15. A mobile wireless device comprising:
- a locating device for detecting a current location of the mobile wireless device;
- a memory for storing geographic information, wherein the geographic information comprises one or more outer boundaries and at least one route between a first location and at least one other location;
- an input/output port for sending and/or receiving data over a network;
- a controller coupled to the locating device, the memory, and the input/output port, the controller configured to detect the current location of the user's mobile wireless device and compare the stored geographic information stored in the memory to the current location of the user's mobile wireless device, wherein if the comparison meets predetermined criteria, the controller of the mobile wireless device further configured to transmit a command causing an HVAC controller to transition from a first operating state having a first temperature setpoint to a second operating state having a second temperature setpoint; and
- wherein the comparison is determined to meet the predetermined criteria when the current location of the user's mobile wireless device has crossed at least one of the one or more outer boundaries and is following one of the at least one route.

16. The mobile wireless device according to claim 15, wherein at least one of the one or more outer boundaries is defined relative to a residence of a user.

17. The mobile wireless device according to claim 15, wherein the mobile wireless device does not broadcast GPS coordinates to the network in order to monitor the current location of the user's mobile wireless device or compare the stored geographic information and the current location of the mobile wireless device.

18. The mobile wireless device according to claim 15, wherein the controller is further configured to transmit the command to a remote server via the network.

19. The mobile wireless device according to claim 15, wherein the controller is further configured to learn the at least one route.

20. A method of controlling an HVAC system using a mobile wireless device, the method comprising:
- storing geographic information including an outer boundary about a first location and a route between the first location and a second location in a memory of the mobile wireless device, the mobile wireless device comprising a locating device for detecting a current location of the mobile wireless device, an input/output port for sending and/or receiving data over a network, a controller coupled to the locating device, the memory, and the input/output port;
- the controller of the mobile wireless device monitoring a current location of the mobile wireless device; and
- the controller of the mobile wireless device comparing the stored geographic information and the current location of the mobile wireless device, and:
  - if the comparison meets a first predetermined criteria, the controller of the mobile wireless device transmitting a first command causing an HVAC controller to transition from a first operating state having a first temperature setpoint to a second operating state having a second temperature setpoint, wherein the first predetermined criteria comprises a determination that the mobile wireless device has crossed the outer boundary; and
  - if the comparison meets a second predetermined criteria, the mobile wireless device transmitting a second command, wherein the first and second commands are different, and wherein the second predetermined criteria comprises a determination that the mobile wireless device is following the route.

21. The method according to claim 20, wherein the mobile wireless device does not broadcast GPS coordinates to the network in order to monitor the current location of the mobile wireless device or compare the stored geographic information and the current location of the mobile wireless device.

* * * * *